(12) United States Patent
Kitamori et al.

(10) Patent No.: US 8,576,322 B2
(45) Date of Patent: *Nov. 5, 2013

(54) IMAGE SHOOTING APPARATUS, VIDEO DISPLAY APPARATUS, AND VIDEO PROCESSING SYSTEM THEREWITH

(75) Inventors: Yutaka Kitamori, Kadoma (JP); Ichiro Yamada, Kobe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,996

(22) Filed: Aug. 24, 2012

(65) Prior Publication Data

US 2012/0320250 A1 Dec. 20, 2012

Related U.S. Application Data

(63) Continuation of application No. 12/771,712, filed on Apr. 30, 2010, now Pat. No. 8,284,288.

(30) Foreign Application Priority Data

May 1, 2009 (JP) ................................. 2009-111690

(51) Int. Cl.
*H04N 5/232* (2006.01)
*H04N 5/76* (2006.01)
*H04N 5/222* (2006.01)
*H04N 7/00* (2011.01)
*H04N 11/00* (2006.01)
*H04N 9/75* (2006.01)

(52) U.S. Cl.
USPC ............... 348/333.06; 348/211.5; 348/231.6; 348/333.12; 348/460; 348/583

(58) Field of Classification Search
USPC .......... 348/207.1, 211.4–211.6, 211.8, 231.3, 348/231.6, 333.01, 333.06, 333.12; 460/583

See application file for complete search history.

(56) References Cited

U.S. PATENT DOCUMENTS

| 8,077,243 | B2 | 12/2011 | Morita et al. |
| 2008/0180551 | A1 | 7/2008 | Koike |
| 2009/0083667 | A1 | 3/2009 | Uchida et al. |
| 2009/0102972 | A1 | 4/2009 | Kurita et al. |
| 2009/0167552 | A1 | 7/2009 | Sato et al. |
| 2009/0207183 | A1 | 8/2009 | Matsuura |
| 2010/0111489 | A1 | 5/2010 | Presler |
| 2010/0269137 | A1 | 10/2010 | Nakajima et al. |

FOREIGN PATENT DOCUMENTS

| JP | 10-210349 A | 8/1998 |
| JP | 11-177917 A | 7/1999 |

*Primary Examiner* — Daniel M Pasiewicz
(74) *Attorney, Agent, or Firm* — Westerman, Hattori, Daniels & Adrian, LLP

(57) ABSTRACT

An image shooting apparatus records video information obtained by shooting a subject, and transfers the video information to an external appliance by communication conforming to the HDMI standards. The image shooting apparatus also records rotation information representing how, when a video based on the video information is displayed on the external appliance, the video is to be rotated, and, when transferring the video information, transmits the rotation information to the external appliance by use of CEC conforming to the HDMI standards. Thus, an image shooting apparatus that transmits a shot video to an external appliance also transmits rotation information by use of CEC so as to be capable of making the external appliance display the shot image in a rotated state.

2 Claims, 4 Drawing Sheets

FIG.5

| | FILE NAME: F20090416 | |
|---|---|---|
| No. | TIMING (SECONDS) | ROTATION ANGLE (DEGREES) |
| 1 | 15 | +90 |
| 2 | 40 | 0 |
| ⋮ | ⋮ | ⋮ |

FIG.6

| | FILE NAME: F20090416 | |
|---|---|---|
| No. | TIMING (SECONDS) | ROTATION ANGLE (DEGREES) |
| 1 | 15 | +90 |
| 2 | 40 | 0 |
| 3 | 63 | -90 |
| ⋮ | ⋮ | ⋮ |

(ADDED INFORMATION)

IMAGE SHOOTING APPARATUS, VIDEO DISPLAY APPARATUS, AND VIDEO PROCESSING SYSTEM THEREWITH

CROSS-REFERENCE TO RELATED APPLICATION

This application is a Continuation of U.S. application Ser. No. 12/771,712, filed on Apr. 30, 2010, which is based on and claims the benefit of priority from Japanese Patent Application No. 2009-111690 filed on May 1, 2009, the entire contents of which are hereby incorporated by reference.

BACKGROUND OF THE INVENTION

1. Field of the Invention

The present invention relates to an image shooting apparatus for shooting an image, also relates to a video display apparatus, and further relates to a video processing system provided with such an image shooting apparatus and a video display apparatus.

2. Description of Related Art

Conventionally, image shooting apparatuses (such as video cameras) have been widely used for shooting subjects such as landscapes. In particular, recent years have seen the spread of compact, inexpensive image shooting apparatuses, which have enabled the general public to enjoy image shooting comfortably. In addition, various technologies have been proposed for enhancing the functions of image shooting apparatuses; for example, there have been proposed technologies for correcting videos shot with video cameras.

On the other hand, many digital AV (audiovisual) appliances like image shooting apparatuses and video display apparatuses (such as television receivers) as mentioned above incorporate an interface (HDMI interface) conforming to the HDMI (high-definition multimedia interface) standards. With an HDMI interface, it is possible to transfer video, audio, and other data at high speed via a single cable.

In that way, it is possible to transfer a video shot with an image shooting apparatus to a video display apparatus so that the shot video may be displayed on the video display apparatus. This meets users' demand to "watch shot videos on larger screens."

The HDMI standards provide not only for AV output etc. but also for CEC (consumer electronics control) functions, i.e., functions for mutual control between different appliances. By CEC, appliances with an HDMI interface can exchange control commands etc. among them, allowing one-to-one or one-to-many control of the appliances.

An example of CEC functions is a "one-touch play function." With this function, for example, when a "playback" button on a video camera is pressed, a television receiver connected to it starts up automatically and accepts input of video information etc. from the video camera. The HDMI standards define many other functions, and which of them to implement is left to the arbitrary discretion of appliance manufacturers.

In environments where image shooting apparatuses can be used comfortably as mentioned above, it is often the case that image shooting is performed by users who are unfamiliar with the handling of appliances. This is considered to be the reason that image shooting is often performed with an image shooting apparatus inclined, producing shot videos that are toppled sideways or are slanted (inclined). On the other hand, it may happen that while image shooting itself is performed normally, the viewer wishes to see videos deliberately inclined to suit his purpose. Against this background, a function of displaying a shot video after rotating it as desired (rotated display of a shot video) turns out to be convenient to users, because it allows correction of an inclined video and other capabilities. In particular, in a case where a shot video is transferred from an image shooting apparatus to a video display apparatus, if the video display apparatus is provided with a function of rotating a video, it is possible, for example by adopting a configuration that permits information such as a rotation angle (rotation information) to be transferred from the image shooting apparatus to the video display apparatus, to achieve rotated display of a shot video. Moreover, communication between appliances for such a function can be realized with high reliability by use of well-established CEC functions.

SUMMARY OF THE INVENTION

According to the present invention, an image shooting apparatus is configured as follows: the image shooting apparatus records video information obtained by shooting a subject; the image shooting apparatus transfers the video information to an external appliance by communication conforming to the HDMI standards; the image shooting apparatus records rotation information representing how, when a video based on the video information is displayed on the external appliance, the video is to be rotated; and, when transferring the video information, the image shooting apparatus transmits the rotation information to the external appliance by use of CEC conforming to the HDMI standards.

BRIEF DESCRIPTION OF THE DRAWINGS

These and other features of the present invention will become clear from the description of preferred embodiments below taken in conjunction with the accompanying drawings, in which:

FIG. 5 is a diagram illustrative of a rotation management table; and

FIG. 6 is a diagram illustrative of a rotation management table.

DETAILED DESCRIPTION OF PREFERRED EMBODIMENTS

Figure 1:
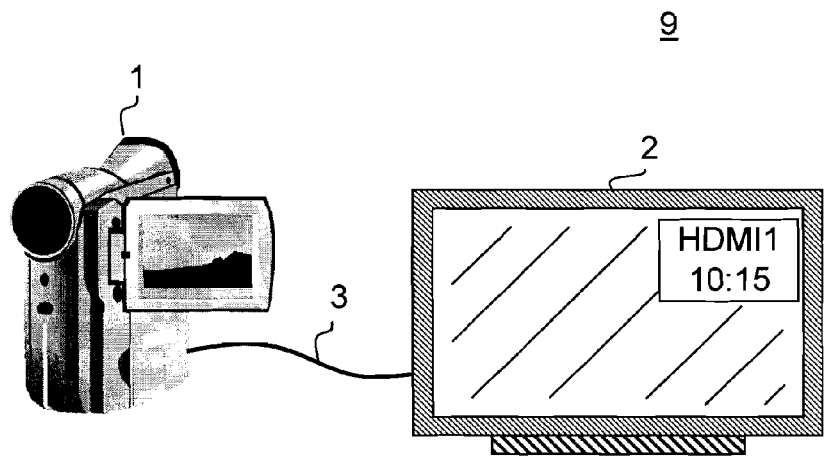
FIG. 1 is a configuration diagram of a video processing system according to an embodiment of the invention.

An embodiment of the present invention will be described below. The following description will take up, as an example, a video processing system for processing video information (video data). FIG. 1 is a configuration diagram of the video processing system. As shown in the figure, the video processing system 9 has a video camera 1 and a television receiver 2, and these two appliances (apparatuses, devices) are connected together by an HDMI cable (a cable conforming to the HDMI standards) 3. This permits the two appliances to exchange video information, CEC-related information, etc.

Figure 2:
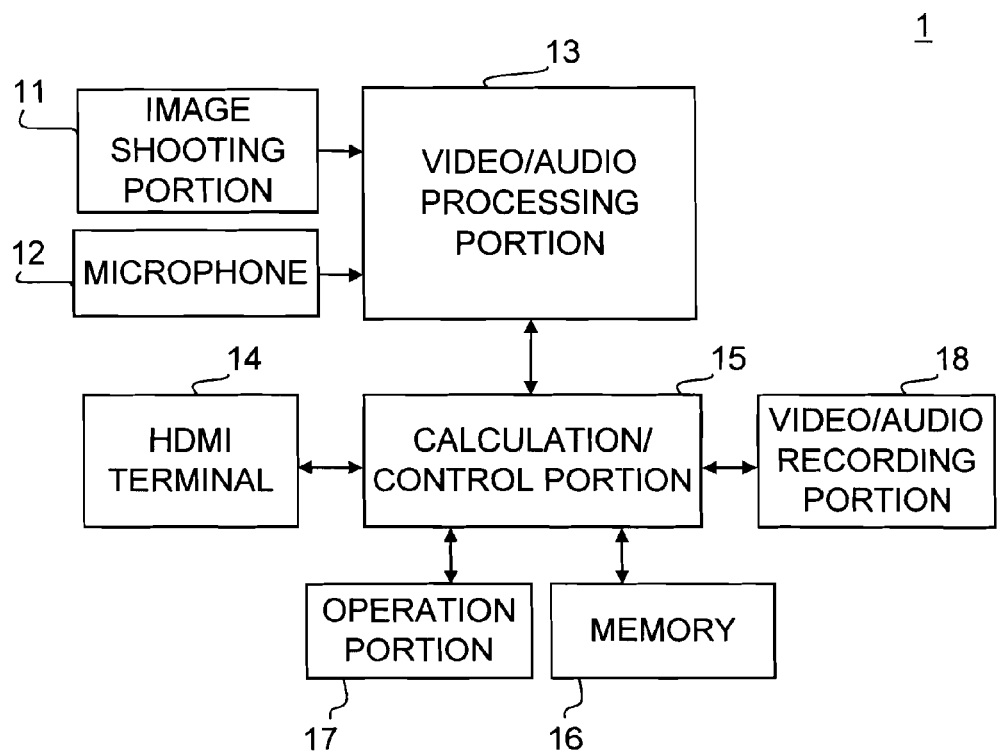
FIG. 2 is a configuration diagram of a video camera according to an embodiment of the invention.

As shown in FIG. 2, the video camera 1 is provided with an image shooting portion 11, a microphone 12, a video/audio processing portion 13, an HDMI terminal 14, a calculation/control portion 15, a memory 16, an operation portion 17, a video/audio recording portion 18, etc.

The image shooting portion 11 is provided with a lens, an image sensor, etc., and executes shooting of a subject (continuous acquisition of an image in the form of data which represents an optical image of the subject) according to an instruction from the calculation/control portion 15. A video signal obtained by shooting is delivered to the video/audio processing portion 13. The microphone 12 acquires an audio signal representing the ambient sounds, and delivers it to the video/audio processing portion 13.

The video/audio processing portion 13 applies predetermined processing to video and audio signals delivered to it from the preceding stage, to acquire video/audio information (information containing video and audio information in a synchronized state). According to an instruction from the calculation/control portion 15, the acquired video/audio information is recorded to the video/audio recording portion 18, or fed out via the HDMI terminal 14 to outside.

The HDMI terminal 14 is where an HDMI cable is attached. In the video processing system 9, an HDMI cable 3 is attached to the HDMI terminal 14 for connection with the television receiver 2. Information fed in from the television receiver 2 is delivered to the calculation/control portion 15.

The calculation/control portion 15 is, for example, built around a CPU or the like, and executes various kinds of processing necessary to realize the functions of the video camera 1. The contents of the processing executed in the video camera 1 will be discussed later.

The memory 16 stores various kinds of information such as programs read by the calculation/control portion 15. The information recorded on the memory 16 includes a "rotation management table" as shown in FIG. 5. A rotation management table is created each time a new video/audio file, which will be described later, is created, in one-to-one correspondence with it (that is, one separate rotation management table is created for each individual video/audio file). The specific contents of a rotation management table, how it is used, etc. will be described later.

The operation portion 17 has, for example, push button switches, a remote control signal receiving device, etc., and is operated by a user. How it is operated is communicated to the calculation/control portion 15. This permits the calculation/control portion 15 to execute processing reflecting the user's intention.

The video/audio recording portion 18 is built around a large-capacity recording medium such as a HDD (hard disk drive), and allows the calculation/control portion 15 to read and write data from and to it. The video/audio recording portion 18 is mainly used to record video/audio information fed from the video/audio processing portion 13.

The video camera 1 is further provided with a display and a speaker. These permit a user to confirm, on a real time basis, the video and audio acquired via the image shooting portion 11 and the microphone 12, and to play back recorded video/audio information.

Figure 3:
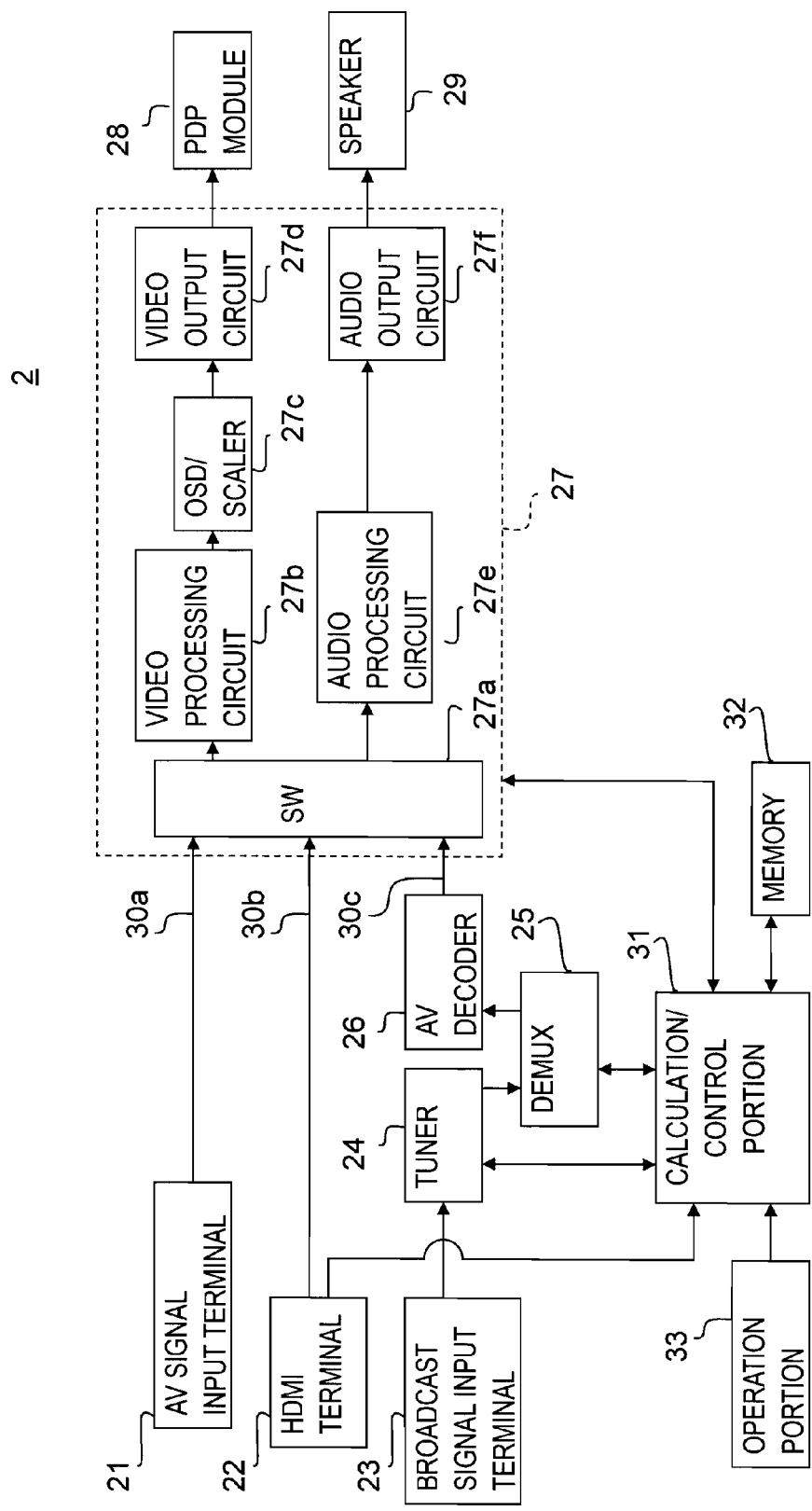
FIG. 3 is a configuration diagram of a television receiver according to an embodiment of the invention.

As shown in FIG. 3, the television receiver 2 is provided with an AV signal input terminal 21, an HDMI terminal 22, a broadcast signal input terminal 23, a tuner 24, a DEMUX (demultiplexing) circuit 25, an AV decoder 26, a video/audio processing portion 27, a PDP (plasma display panel) module 28, a speaker 29, a first to a third signal path 30a to 30c, a calculation/control portion 31, a memory 32, an operation portion 33, etc.

The AV signal input terminal 21 is provided in the form of a component terminal or a D terminal, and accepts input of video and audio signals from an external appliance (apparatus, device) by a predetermined cable. The signals fed in are supplied to the first signal path 30a.

The HDMI terminal 22 is where an HDMI cable is attached. In the video processing system 9, the HDMI cable 3 is attached to the HDMI terminal 22 for connection with the video camera 1. Signals fed in from the video camera 1 are delivered to the calculation/control portion 31, and are also supplied to the second signal path 30b.

The broadcast signal input terminal 23 is connected to an unillustrated antenna or the like, and receives input of television broadcast signals from outside. The tuner 24 applies selection processing to the television broadcast signals delivered to it from the broadcast signal input terminal 23, and delivers the result via the DEMUX circuit 25 to the AV decoder 26. What channel to select is determined according to an instruction entered via the operation portion 33 by a user.

The AV decoder 26 applies demodulation and other processing to the television broadcast signal delivered to it, to extract video and audio signals. The thus obtained signals are supplied to the third signal path 30c.

The video/audio processing portion 27 processes the video and audio signals fed to it from the preceding stage, and has a switch 27a, a video processing circuit 27b, an OSD/scaler circuit 27c, a video output circuit 27d, an audio processing circuit 27e, an audio output circuit 27f, etc.

The switch 27a has its preceding-stage side connected to the first to third signal paths 30a to 30c, and has its succeeding-stage side connected to the video processing circuit 27b and to the audio processing circuit 27e. According to an instruction from the calculation/control portion 31, the switch 27a switchably connects one of the first to third signal paths 30a to 30c to the video processing circuit 27b and the audio processing circuit 27e.

In this way, the television receiver 2 can set one of the input terminals 21 to 23 valid (can receive video and audio signals via it). Specifically, owing to the operation of the switch 27a, when the first signal path 30a is connected to the succeeding stage, the AV signal input terminal 21 is set valid; when the second signal path 30b is connected to the succeeding stage, the HDMI terminal 22 is set valid; and when the third signal path 30c is connected to the succeeding stage, the broadcast signal input terminal 23 is set valid. The configuration here is such that even when an analog signal is fed in via an input terminal, it is digitized before it reaches the switch 27a.

The video processing circuit 27b extracts a video signal from the signal delivered to it from the preceding stage, and feeds the result to the OSD/scaler circuit 27c. According to an instruction from the calculation/control portion 31, the OSD/scaler circuit 27c executes OSD (on-screen display) processing (processing whereby predetermined on-line display is superimposed on the video of the video signal) and video rotation.

Through the processing of video rotation, the input video is rotated by a specified angle substantially about an axis through the center of the video. Thus, even when shooting is performed with the video camera 1 inclined and the shot video is inclined, by executing video rotation so as to cancel the inclination, it is possible to display a video with no inclination.

The video output circuit 27d feeds the video signal received from the OSD/scaler circuit 27c to the PDP module 28. The PDP module 28 has a PDP (plasma display panel, hereinafter abbreviated to "panel"), and displays the video of the video signal fed to it.

The audio processing circuit 27e extracts an audio signal from the signal delivered to it from the preceding stage, and feeds the result to the audio output circuit 27f. The audio output circuit 27f feeds the received audio signal to the speaker 29. The speaker 29 then outputs the audio of the audio signal fed to it.

The calculation/control portion 31 is, for example, built around a CPU or the like, and executes various kinds of processing to realize the functions of the television receiver 2. The contents of the processing executed in the television receiver 2 will be discussed later. As the calculation/control portion 31, there may instead be provided two separate CPUs configured to be capable of communicating with each other, specifically a first CPU (to which electric power continues to be supplied even when the television receiver 2 is turned off by remote control) which mainly handles reception of remote control signals, control of the tuner 24, etc., and a second CPU which mainly handles control of the video/audio processing portion 27 and the PDP module 28 etc.

The memory 32 stores various kinds of information such as programs read by the calculation/control portion 31. The information recorded on the memory 32 includes "rotation angle information." The rotation angle information identifies the degree by which (the rotation angle at which) to rotate a video when one is displayed on the panel of the PDP module 28.

For example, when the rotation angle information is set at "+90 degrees," the calculation/control portion 31 controls the OSD/scaler circuit 27c so that the video displayed on the panel is rotated by "+90 degrees." The rotation angle information is set at "0 degrees" (no rotation) every time playback of video/audio information is started, and is updated as necessary through the processing at step S27, which will be described later.

The operation portion 33 has, for example, push button switches, a remote control signal receiving device, etc., and is operated by a user. How it is operated is communicated to the calculation/control portion 31. This permits the calculation/control portion 31 to execute processing reflecting the user's intention.

The video camera 1 configured as described above is itself capable of executing, among others, processing (image shooting and recording processing) whereby a subject is shot to acquire video/audio information which is then recorded to the video/audio recording portion 18. In the image shooting and recording processing, what is performed after a user enters an instruction to start shooting until he enters an instruction to stop shooting (both instructions are entered via the operation portion 17) is taken as one session of shooting, and the video/audio information acquired during that period is recorded in a single video/audio file. As such processing is repeated, one video/audio file after another is accumulated in the video/audio recording portion 18. Each video/audio file can be managed separately (can be edited and deleted separately).

The television receiver 2 configured as described above is itself capable of executing, among others, processing (television broadcast reception processing) whereby video and audio information is acquired from a broadcast station so that video is displayed and audio is reproduced.

With the two appliances connected together, i.e., as the video processing system 9 as a whole, it is possible to execute, among others, processing (recorded video transfer and playback processing) whereby video/audio information recorded in the video camera 1 is transferred to the television receiver 2 for playback on the television receiver 2. In the recorded video transfer and playback processing, as will be described later, it is possible to display a video in a rotated state according to a current or past instruction from a user.

Figure 4:
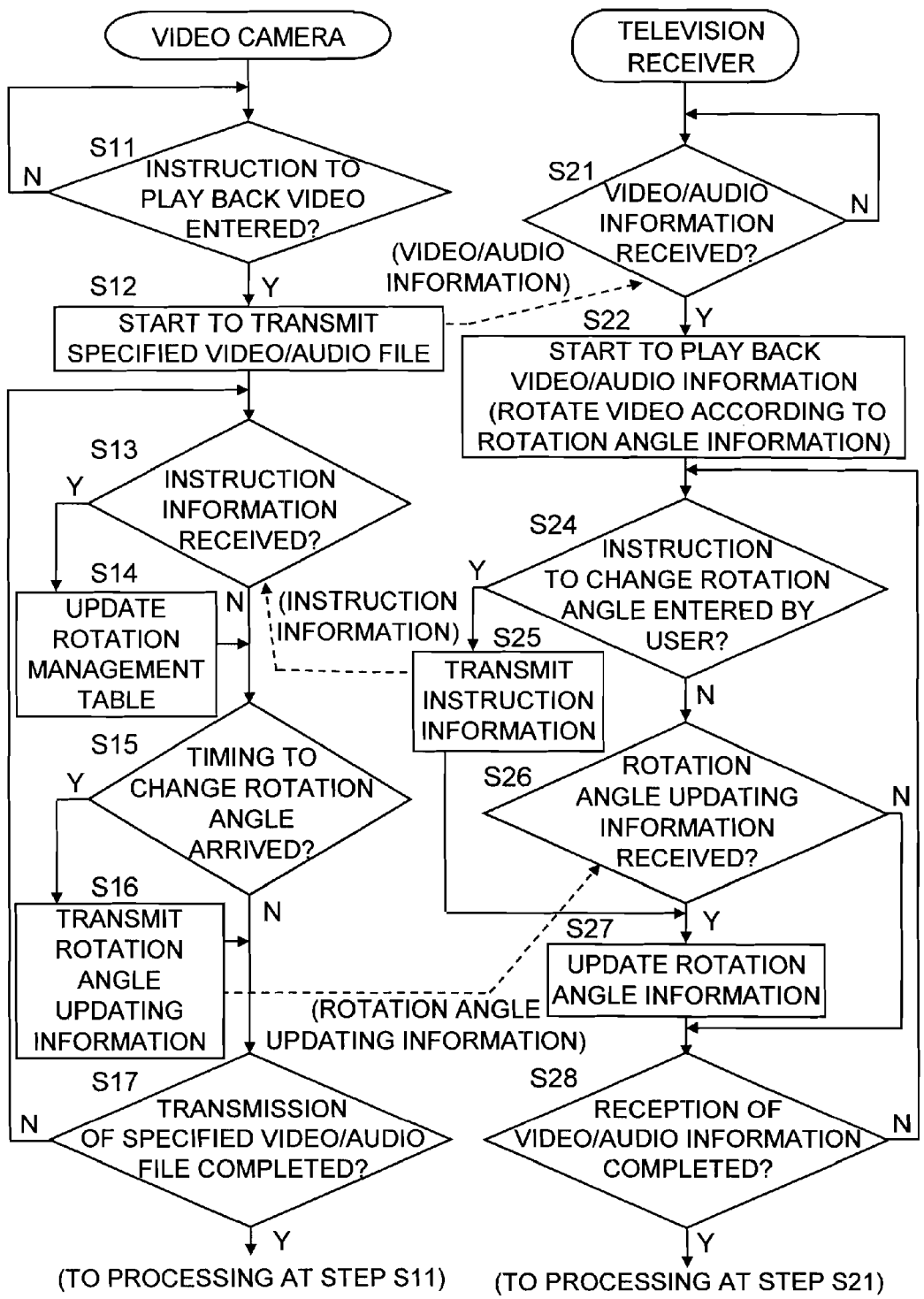
FIG. 4 is a flow chart of processing for transfer and display of a recorded video.

Now, the contents of the recorded video transfer and playback processing will be described in more detail with reference to a flow chart in FIG. 4.

In normal operation, the video camera 1 (calculation/control portion 15) monitors whether or not a user has specified any video/audio file and has entered an instruction to execute video playback (step S11). The video playback here is processing whereby a specified video/audio file is transferred to the television receiver 2 and the video and audio are played back on the television receiver 2.

When such an execution instruction is entered (when the operation portion 17 is operated in a predetermined manner) ("Y" at step S11), the video camera 1 starts to transmit the specified video/audio file to the television receiver 2 (step S12). Thereafter, transmission of the video/audio file continues at a prescribed rate until completed.

Here, it is assumed that, prior to transmission of the video/audio file, in the television receiver 2, the HDMI terminal 22 connected to the video camera 1 is set valid (a state in which reception of video/audio information is possible is established). In the video processing system 9, there may be provided a one-touch play function by CEC. In this way, even if another input terminal is valid in the television receiver 2 before the start of playback, the valid input terminal is switched to the HDMI terminal 22 at the time point of the start of playback, and it is thus possible to properly receive video/audio information.

While transmission of the video/audio file continues, the video camera 1 executes the following processing. First, the video camera 1 checks whether or not instruction information has been received from the television receiver 2 (step S13). The instruction information here is information representing a timing and a rotation angle, and will be described in detail later (see step S24). If instruction information has been received ("Y" at step S13), according to it, the video camera 1 updates the rotation management table recorded on the memory 16 (step S14).

As shown in FIG. 5, the "rotation management table" is information representing how to change the rotation angle of video rotation at what timing (how many seconds after the start of playback). In the specific case shown in FIG. 5, the rotation management table represents the following: after playback is started with a rotation angle of 0 degrees (without rotation), at 15 seconds after the start of playback, the rotation angle is changed to +90 degrees; likewise, at 40 seconds, the rotation angle is changed to 0 degrees. In this way, the rotation management table represents how to rotate a video (the shot video transferred from the video camera 1 to the television receiver 2 for display).

For example, in a case where the rotation management table of the video/audio file currently being transmitted is as shown in FIG. 5, when instruction information containing an instruction "to rotate by −90 degrees at 63 seconds after the start of playback" is received, then, as shown in FIG. 6, information corresponding to that instruction information is added.

After completion of the processing at step S14, or if no instruction information has been received ("N" at step S13), then, next, the video camera 1 checks, based on the rotation management table of the video/audio file currently being transmitted, whether or not a timing at which to change the rotation angle has arrived (step S15). If such a timing has arrived ("Y" at step S15), based on the rotation management table, the video camera 1 creates rotation angle updating information for updating the rotation angle of the video, and transmits it to the television receiver 2 (step S16).

For example, in a case where the rotation management table of the video/audio file currently being transmitted is as shown in FIG. 6, it is judged whether or not timings of 15 seconds, 40 seconds, and 63 seconds after the start of transmission of the video/audio information have arranged (step S15). When the timing of 15 seconds after the start of transmission has arrived ("Y" at step S15), rotation angle updating information for updating the rotation angle of the video to +90 degrees is transmitted to the television receiver 2 (step S16). This rotation angle updating information too may be said to be information representing how to rotate the video (the shot video transferred from the video camera 1 to the television receiver 2 for display).

The above-mentioned transmission of rotation angle updating information is achieved by use of CEC in the HDMI standards. For information, examples of communication formats according to CEC will be shown below in Table 1 (for notification of a rotation angle) and Table 2 (for inquiry for a rotation angle).

TABLE 1

| Position in Data | Contents | Example |
| --- | --- | --- |
| Byte 1 | Address | 0x40 or 0x04 |
| Byte 2 | OP_Code | 0x89 |
| Byte 3 | Notification of Rotation Angle | 0x10 |
| Byte 4 | Rotation Angle | 0x** |

TABLE 2

| Position in Data | Contents | Example |
| --- | --- | --- |
| Byte 1 | Address | 0x40 or 0x04 |
| Byte 2 | OP_Code | 0x89 |
| Byte 3 | Inquiry for Rotation Angle | 0x11 |

The first byte (byte 1) indicates the direction of communication; for example, "0x40" represents communication from the video camera (logical address: 4) to the television receiver (logical address: 0). The second byte (byte 2) indicates whether or not the subsequent information is a vendor-specific code; for example, "0x89" represents that it is a vendor-specific code.

In the third byte (byte 3), "0x10" represents "notification" and "0x11" represents "inquiry (acquisition)." When byte 3 is "0x10," the fourth byte (byte 4) represents the rotation angle. For the rotation angle, for example, "0x01" represents +90 degrees, "0x02" represents 0 degrees, "0x03" represents −90 degrees, and "0x04" represents 180 degrees.

After completion of the processing at step S16, or if no timing at which to change the rotation angle has arrived ("N" at step S15), the video camera 1 checks whether or not transmission of the specified video/audio file has been completed (whether or not the video/audio information of that file has been transmitted to the end) (step S17). If it has not yet been completed ("N" at step S17), the processing at step S13 is repeated; if it has been completed ("Y" at step S17), the processing at step S11 is repeated.

On the other hand, the television receiver 2 monitors whether or not video/audio information has started to be received from the video camera 1 (step S21). If it has started to be received ("Y" at step S21), the television receiver 2 starts playback of the video/audio information being received (step S22). Specifically, the television receiver 2 properly processes the video/audio information in the video/audio processing portion 27, displays the resulting video on the panel of the PDP module 28, and reproduces the resulting audio from the speaker 29. Thereafter, playback of the video/audio information continues until reception of the video/audio information comes to an end (see step S28).

While playback of the video/audio information continues, the television receiver 2 executes the following processing. The television receiver 2 accepts an instruction to change the rotation angle from a user (in the form of operation on the operation portion 33). In this way, while watching the video being displayed on the panel of the PDP module 28, a user can enter an instruction to change the rotation angle (as by entering information identifying the rotation angle) at a timing at which he wants to change the rotation angle of video rotation.

Entry of information identifying the rotation angle may be done by entering the degree by which (how many degrees) the video currently being displayed is inclined. In that case, for example, when a statement to the effect that "the current inclination is +90 degrees" is entered, it is interpreted as entry of an instruction to change the rotation angle to "−90 degrees" to compensate for the inclination.

The television receiver 2 then checks whether or not such a rotation angle change instruction has been entered (step S24). If one has been entered ("Y" at step S24), the television receiver 2 recognizes the timing at which that instruction was entered (how many seconds after the start of playback the operation for the rotation angle change instruction was made) and the rotation angle identified by the rotation angle change instruction (at what rotation angle to rotate the video). The television receiver 2 then, by use of CEC, creates instruction information representing the recognized results, i.e., instruction information identifying the timing after the start of playback and the rotation angle, and transmits it to the video camera 1 (step S25). This instruction information too may be said to be information representing how to rotate the video (the shot video transferred from the video camera 1 to the television receiver 2 for display).

In addition to executing the processing at step S25, the television receiver 2 updates the set contents of the rotation angle information recorded on the memory 32 to the rotation angle identified from the rotation angle change instruction (step S27). Thus, during the playback of the video/audio information thereafter, the video is displayed in a state rotated according to the contents of the rotation angle change instruction, until the rotation angle information is updated next time.

On the other hand, if no rotation angle change instruction has been entered ("N" at step S24), then, next, the television receiver 2 checks whether or not new rotation angle updating information has been received (step S26). If any has been received ("Y" at step S26), the television receiver 2 updates the set contents of the rotation angle information recorded on the memory 32 to the rotation angle identified from the rotation angle updating information (step S27).

Thus, approximately at the same timing that the video camera 1 transmits the rotation angle updating information (i.e., approximately at the same timing as that indicated by the rotation management table), the set contents of the rotation angle information are updated. During the playback of the video/audio information thereafter, the video is displayed in a state rotated according to the contents of the rotation angle updating information, until the rotation angle information is updated next time. In this way, the shot video transferred from the video camera 1 to the television receiver 2 for display is rotated in accordance with the contents of the rotation management table recorded in the video camera 1.

After completion of the updating of rotation angle information (step S27), or if no rotation angle updating information has been received ("N" at step S26), then the television receiver 2 checks whether or not reception of the video/audio information has been completed (step S28). If it is has not yet been completed ("N" at step S28), the processing at step S24 is repeated; if it has been completed ("Y" at step S28), the processing at step S21 is repeated.

Executing the recorded video transfer and playback processing described above permits a user to watch, on the television receiver 2, video and audio recorded in the video camera 1. Moreover, during playback of video, whenever the user wants to rotate the video or change the rotation angle, he can satisfy his need by entering an instruction to change the rotation angle in the television receiver 2 (see steps S24 and S27).

When an instruction to change the rotation angle is entered, the information is recorded to the rotation management table (see steps S13, S14, S24, and S25). During playback of video, according to the rotation management table, the video is rotated, or the rotation angle is changed (see steps S15, S16, S26, and S27). Thus, when recorded video transfer and playback processing is performed for the second and subsequent times with the same video/audio file, the video is rotated, or the rotation angle is changed, according to the rotation angle change instruction that a user entered in the past. This eliminates the need to enter a rotation angle change instruction every time recorded video transfer and playback processing is performed, and is very convenient to users.

How the recorded video transfer and playback processing is performed is not limited to as specifically described above, but allows many variations and modifications. For example, for one whole video/audio file, the rotation angle at which the video is rotated may be fixed (the rotation angle is kept constant from the start to the end of playback). In this way, instead of performing the processing at steps S15 and S16, the video camera 1 has only to transmit information identifying the rotation angle, for example, at the start of transmission of a video/audio file.

As described above, the video camera 1 (image shooting apparatus) according to the embodiment records video information (a shot video) obtained by shooting a subject to the video/audio recording portion 18 and in addition transfers the shot video to the television receiver 2 (an external appliance) by communication conforming to the HDMI standards. Moreover, while the shot video is being displayed on the television receiver 2, the video camera 1 records a rotation management table (an example of rotation information) representing how the video is rotated, and, when the shot video is transferred, the video camera 1 transmits rotation angle updating information (another example of rotation information) to the television receiver 2 by use of CEC conforming to the HDMI standards.

Thus, the video camera 1 can make the television receiver 2 display a shot video in a rotated state. This makes, for example, correction of an inclined video possible, and thus offers enhanced convenience. Moreover, since communication between the appliances is achieved by use of CEC, which has been well-established, it is possible to easily realize highly reliable communication.

It is to be understood that the specific embodiment by way of which the present invention has been described above is in no way meant to limit the invention, which therefore may be carried out with many variations and modifications made without departing from the spirit of the invention.

An object of the present invention is to provide an image shooting apparatus that transmits a shot video to an external appliance and that transmits rotation information as well by use of CEC so that the shot video may be displayed in a rotated state on the external appliance, and to provide a video processing system provided with such an image shooting apparatus.

To achieve the above object, according to the invention, an image shooting apparatus is configured as follows: the image shooting apparatus records video information obtained by shooting a subject; the image shooting apparatus transfers the video information to an external appliance by communication conforming to the HDMI standards; the image shooting apparatus records rotation information representing how, when a video based on the video information is displayed on the external appliance, the video is to be rotated; and, when transferring the video information, the image shooting apparatus transmits the rotation information to the external appliance by use of CEC conforming to the HDMI standards.

With this configuration, it is possible to make the external appliance display the shot video in a rotated state. This makes, for example, correction of an inclined video possible, and thus offers enhanced convenience. Moreover, since communication between the appliances is achieved by use of CEC, which has been well-established, it is possible to easily realize highly reliable communication.

According to the invention, a video display apparatus is configured as follows: the video display apparatus receives video information from an external appliance by communication conforming to the HDMI standards; when receiving the video information, the video display apparatus also receives rotation information representing how, when the video display apparatus displays a video based on the video information, to rotate the video; and the video display apparatus displays the video based on the video information after rotating the video according to the rotation information.

According to the invention, a video processing system provided with an image shooting apparatus and a video display apparatus is configured as follows: the image shooting apparatus records video information obtained by shooting a subject, and transfers the video information to the video display apparatus by communication conforming to the HDMI standards; the image shooting apparatus records rotation information representing how, when a video based on the video information is displayed on the video display apparatus, the video is to be rotated; when transferring the video information, the image shooting apparatus transmits the rotation information to the video display apparatus by use of CEC conforming to the HDMI standards; the video display apparatus receives the transferred video information and displays the video based on the video information; and the video display apparatus displays the video after rotating the video according to the rotation information. With this configuration, with respect to the video displayed on the video display apparatus, it is possible, for example, to correct an inclined video.

The above configuration may be such that: the video display apparatus creates the rotation information based on information entered by a user, and transmits the rotation information by use of CEC conforming to the HDMI standards; and the image shooting apparatus receives the rotation information from the video display apparatus and records the rotation information. With this configuration, it is possible to rotate the video as a user desires.

The above configuration may be such that: the video display apparatus accepts entry of a rotation angle by a user, and detects the timing at which the rotation angle is entered; the video display apparatus creates the rotation information representing the detected timing and the entered rotation angle, and transmits the rotation information to the image shooting apparatus; and during display of the video based on the video information, when the timing represented by the rotation information arrives, the video based on the video information is rotated by the rotation angle represented by the rotation information. With this configuration, it is easy to rotate the video displayed on the video display apparatus at a desired timing.

The above configuration may be such that: every time shooting is executed, the image shooting apparatus records video information obtained from the shooting in a separate file, and for each such file, the image shooting apparatus records the rotation information. With this configuration, it is possible to set, for each file, how to rotate the video, resulting in enhanced convenience.

According to another aspect of the invention, a video display apparatus is configured as follows: the video display apparatus is connected to the image shooting apparatus configured as described above by an HDMI cable, and the video display apparatus receives the transferred video information and displays a video based on the video information; and the video display apparatus displays the video based on the video information after rotating the video according to the rotation information. According to another aspect of the invention, a video processing system is configured to include the image shooting apparatus configured as described above and the video display apparatus configured as described above.

What is claimed is:

1. The video processing system, comprising:
an image shooting apparatus and a video display apparatus, wherein
the image shooting apparatus records video information obtained by shooting a subject, and transfers the video information to the video display apparatus by communication conforming to an HDMI standard,
the image shooting apparatus records rotation information representing how, when a video based on the video information is displayed on the video display apparatus, the video is to be rotated,
when transferring the video information, the image shooting apparatus transmits the rotation information to the video display apparatus by use of CEC conforming to an HDMI standard,
the video display apparatus receives the transferred video information and displays the video based on the video information,
the video display apparatus displays the video after rotating the video according to the rotation information,
the video display apparatus creates the rotation information based on information entered by a user, and transmits the rotation information by use of CEC conforming to an HDMI standard, and
the image shooting apparatus receives the rotation information from the video display apparatus and records the rotation information,
wherein the video display apparatus comprises a plurality of input terminals including an HDMI terminal used in the communication, and one of the plurality of input terminals is set as a terminal to which a video signal can be input,
when the transfer is started, the terminal to which a video signal can be input is switched to the HDMI terminal by CEC conforming to the HDMI standard,
wherein the video display apparatus accepts entry of a rotation angle by a user, and detects a timing at which the rotation angle is entered,
the video display apparatus creates the rotation information representing the detected timing and the entered rotation angle, and transmits the rotation information to the image shooting apparatus, and
during display of the video based on the video information, when the timing represented by the rotation information arrives, the video based on the video information is rotated by the rotation angle represented by the rotation information.

2. The video processing system according to claim 1, wherein
every time shooting is executed, the image shooting apparatus records video information obtained from the shooting in a separate file, and for each such file, the image shooting apparatus records the rotation information.

* * * * *